UNITED STATES PATENT OFFICE.

REINHOLD K. MUENCH, OF GOLDFIELD, COLORADO.

PREPARATION OF PURE IRON.

1,292,630.　　　　　　Specification of Letters Patent.　　Patented Jan. 28, 1919.

No Drawing.　　　Application filed August 13, 1918. Serial No. 249,680.

*To all whom it may concern:*

Be it known that I, REINHOLD K. MUENCH, a citizen of the United States of America, residing at Goldfield, in the county of Teller and State of Colorado, have invented certain new and useful Improvements in the Preparation of Pure Iron, of which the following is a specification.

This invention is a process whereby metallic iron may be obtained in a state of purity heretofore unattainable by commercial methods. The process will be described in its application to the preparation of pure iron from commercial grades of the same metal, it being understood, however, that the impure ferrous chlorid solution resulting from the first stage of the process may be derived from any suitable source, as for example from the liquors resulting from the known methods of pickling iron by hydrochloric acid, or the like.

My preferred procedure is as follows:

A known quantity of commercial iron, which should preferably be of as high degree of purity as possible, is dissolved in an excess of commercial hydrochloric acid, previously diluted by the addition of approximately its own weight of water. The preparation of this solution may be aided by heating. After the iron has been completely dissolved the solution is evaporated until any excess of acid which may have been used is substantially expelled. These several operations, as well as those which follow, are carried out under conditions to avoid, as far as may be practicable, oxidation of the iron through atmospheric action: In other words the iron is retained as far as possible in the ferrous state.

The residue from the evaporation, consisting largely of ferrous chlorid, is now redissolved in the minimum proportion of water sufficient to effect solution. The ferrous iron is thereupon precipitated by the addition of the molecular equivalent of potassium-ferrocyanid, in concentrated solution. The precipitate formed under these conditions consists essentially of an impure potassium-ferrous-ferrocyanid, which may be represented by the formula $K_2FeFe(CN)_6$.

Upon completion of this precipitation, the contents of the vessel are quickly filtered, and the precipitate freed from mother liquor. The precipitate while yet moist is transferred to a vessel of porcelain or other acid-proof ware, and treated with concentrated hydrochloric acid in some excess of the molecular proportion to the iron. To insure the best results, all of the operations up to this point should be carried out with relatively concentrated solutions, excess of water being avoided, and the compounds retained as far as possible in the non-oxidized (ferrous) condition.

Heat is applied and the solution evaporated nearly to dryness; pure water is then added and the mixture boiled for approximately one hour, whereby ferrous chlorid passes into solution. A residue consisting largely of ferric oxids, ferricyanids and insoluble cyanids and other compounds of foreign metals remains undissolved, and may be separated, for example by filtration or decantation. Repeated attack of the residue by concentrated hydrochloric acid under similar conditions results in the recovery of further quantities of the iron as ferrous chlorid.

The solution thus prepared is substantially pure ferrous chlorid, mixed of course with alkali metal salts, which, however, do not interfere with its subsequent utilization. The solution is directly available for all uses in the arts requiring an iron salt of exceptional purity. It is of particular importance in connection with the preparation of metallic iron of the highest grade of purity. This may be accomplished by any approved method, as for example by electrolyzing the chlorid solution with insoluble anodes, or by oxidizing the solution to the ferric state, precipitating the iron as ferric hydroxid, igniting the latter, and reducing the resulting ferric oxid by means of hydrogen or other appropriate reducing agent.

To avoid unnecessary loss of hydrochloric acid, the fumes arising during evaporation may be conveyed to any suitable acid-proof condenser, and there condensed in condition for use in a repetition of the process. Similarly the potassium salts may be recovered by crystallization from the solution remaining after the precipitation of the iron. It will be understood that in this process other soluble ferrocyanids, including sodium ferrocyanid, are regarded as equivalent to the potassium salt.

I claim:—

Process of preparing a solution of ferrous chlorid suitable for the recovery of pure iron, comprising precipitating iron from an impure ferrous solution as potassium-ferrous-ferrocyanid; decomposing the resulting precipitate by concentrated hydrochloric acid and expelling excess of acid by evaporation; dissolving the resulting ferrous chlorid in water; and separating the solution from the undissolved residue.

In testimony whereof, I affix my signature.

REINHOLD K. MUENCH.